(12) United States Patent
Sugiura

(10) Patent No.: US 7,221,697 B2
(45) Date of Patent: May 22, 2007

(54) RECEIVED RADIO WAVE TRANSMISSION EQUIPMENT AND MOBILE BODY IDENTIFICATION SYSTEM

(75) Inventor: Akihiko Sugiura, 5-202 Takashijutaku, 2-1 Azahigashiura, Kitayama-cho, Toyohasi-shi, Aichi 441-8105 (JP)

(73) Assignees: Ibiden Co., Ltd., Gifu (JP); Akihiko Sugiura, Aichi (JP)

( * ) Notice: Subject to any disclaimer, the term of this patent is extended or adjusted under 35 U.S.C. 154(b) by 739 days.

(21) Appl. No.: 10/203,749

(22) PCT Filed: Sep. 6, 2001

(86) PCT No.: PCT/JP01/07751

§ 371 (c)(1),
(2), (4) Date: May 15, 2003

(87) PCT Pub. No.: WO02/49227

PCT Pub. Date: Jun. 20, 2002

(65) Prior Publication Data
US 2005/0075126 A1    Apr. 7, 2005

(30) Foreign Application Priority Data
Dec. 15, 2000  (JP)  .............................. 2000-381339

(51) Int. Cl.
*H04B 1/707* (2006.01)
*H04Q 5/22* (2006.01)

(52) U.S. Cl. ...................... 375/146; 375/147; 340/10.1

(58) Field of Classification Search ................ 375/140, 375/141, 146, 147
See application file for complete search history.

(56) References Cited

U.S. PATENT DOCUMENTS

| 5,533,045 A | 7/1996 | Hasegawa et al. |
| 6,343,095 B1 * | 1/2002 | Moteki et al. ............... 375/152 |
| 6,483,427 B1 * | 11/2002 | Werb .......................... 340/10.1 |

FOREIGN PATENT DOCUMENTS

GB          2 149 275 A       6/1985

(Continued)

OTHER PUBLICATIONS

Investigation of Calculation/Distance Measurement Method Using Spread Spectrum Communications System; Feb. 23, 2001.

*Primary Examiner*—Kevin Kim
(74) *Attorney, Agent, or Firm*—Sughrue Mion, PLLC

(57) ABSTRACT

A base station 21 generates a spectrum-spread spread signal, and transmits up spread signals having different line frequencies to transmission antennas 22a and 22b on two channels, i.e., A channel and B channel, respectively. The up spread signals are subjected to predetermined individual processings by a specific identification card 31 and sent back as a down spread signal on an X channel. Therefore, the base station 21 receives the down spread signal thus sent back by a receiving antenna 23. If receiving the down spread signal, the base station 21 correlates a waveform of the already transmitted up spread signal as a reference waveform with the waveform of the down spread signal. Due to this, the base station 21 can count identification cards 31 which send back down spread signals on the X channel and measure distances from the base station 21 to the respective identification cards 31.

18 Claims, 7 Drawing Sheets

FOREIGN PATENT DOCUMENTS

| | | |
|---|---|---|
| JP | 06-300836 | 10/1994 |
| JP | 09-118086 | 5/1997 |
| JP | 10-145325 | 5/1998 |
| JP | 11 046179 A | 12/1999 |
| WO | WO 92/17947 A | 10/1992 |

* cited by examiner (A)

(B)

(A) 
Waveform of ID information (B) 
Waveform held at base station (C) 
Waveform at $\frac{b}{2} - \frac{b}{4}$ (m)

(D) 
Waveform at $\frac{b}{2} + \frac{b}{4}$ (m)

RECEIVED RADIO WAVE TRANSMISSION EQUIPMENT AND MOBILE BODY IDENTIFICATION SYSTEM

TECHNICAL FIELD OF THE INVENTION

The present invention relates to a received radio wave transmission equipment re-transmitting a received spread signal and a mobile body identification system.

BACKGROUND ART

Recently, with the development of motorization, the convenience of personal level moving means has been rapidly improved; however varied social problems such as traffic congestion, traffic accidents and the deterioration of roadside environment and global environment occur. Nevertheless, the information and communication technology is advancing at considerable rapid speed.

In these social situations of Japan, it is ITS (Intelligent Transport Systems) that are intended to construct advanced networks for people, roads and motor vehicles using the most advanced information and communication technology.

That is, the ITS are new traffic systems established to solve the traffic problems such as traffic accidents and traffic congestions by connecting people, roads and motor vehicles by the information network using the most advanced information and communication technology. The ITS consist of nine development fields according to the master plan jointly defined by relevant five ministries and agencies (the National Police Agency, the Ministry of Transport, the Ministry of Posts and Telecommunications, the Ministry of Construction and the Ministry of International Trade and Industry) in 1996.

Among these nine development fields, in that of "support for public traffic institutions", for example, it is said that needs such as the optimum use of traffic institutions, the improvement of the convenience of public traffic systems and the improvement of the efficiency of business management are voiced by the users of the public traffic and transport businesses.

Specifically, as an example of an existing traffic system, a system that bus passengers take buses regularly circulating the same routes has been established around the country. Under such an existing bus based traffic system, a bus runs on a fixed route in accordance with a preset travel diagram. Due to this, if an event or the like that gathers many people is held in the neighborhood of the route, it is expected that passengers exceeding passenger capacities wait for buses at bus stations. In a case like this, the existing diagram cannot provide transport services which satisfy users. As a result, the needs such as the optimum use of traffic institutions and the improvement of the convenience of public traffic systems arise.

It is considered that if there is a system which can grasp the number of bus passengers at real time, measures such as a temporary change in the number of buses can be taken to shorten time for passengers to wait for buses and smooth, efficient transport services can be thereby provided. Namely, such a system can deal with the needs including the optimum use of traffic institutions, the improvement of the convenience of public traffic institutions and the improvement of the efficiency of business management.

It is also considered that if there is a system which can grasp the distance from a bus which is running on a route to a passenger waiting for the bus, proper measures such as a temporary change in the route can be taken and further smooth, efficient transport services can be thereby provided. Such a system can deal with the needs including the optimum use of traffic institutions, the improvement of the convenience of public traffic institutions and the improvement of the efficiency of business management, as well.

In the meantime, there is known, as one of the exiting techniques for measuring the number of such specific people or mobile bodies or distances to specific people or mobile bodies, a system based on radio waves emitted from, for example, cellular phones and PHS (to be generally referred to as "cellular phones" hereinafter).

The cellular phone based system has, however, the following technical disadvantages. It is necessary to prepare a plurality of types of receiving equipment and the like compatible with various communication modes because of the difference in communication mode among the cellular phones. It is difficult to freely set a measurement range. There are errors in the measurement of the number of people and distances. As a result, the establishment of the system confront many obstructions and the current state is that the system cannot be adapted to "support for public traffic institutions" in the ITS.

Furthermore, the measurement of the number of people and mobile bodies based on cellular pones is attached to cellular phone services provided by specific private corporations. Therefore, the measurement is made on the assumption that people take the cellular phone services of these companies. For that reason, the system intended at the subscribers of the cellular phone services which are of no direct relevance to the ITS is apart from equality and is impractical from public benefit viewpoints of "support for public traffic institutions".

Moreover, if such a system as to be able to identify specific people or mobile bodies at real time exists, it is possible to meet the needs for not only the development field of "support for public traffic institutions" but also automated toll exchange which enables drivers to pass through tollgates without stopping on highways or the like associated with the development field of "electronic toll collection system" in the ITS. The system for identifying people or mobile bodies based on cellular phones is, however, impractical to solve the above-stated varied technical disadvantages.

The present invention has been made to solve the above-stated disadvantages. It is an object of the present invention to provide a received radio wave transmission equipment and a mobile body identification system capable of measuring the number of specific mobile bodies or a distance to a specific mobile body.

It is another object of the present invention to provide a received radio wave transmission equipment and a mobile body identification system capable of identifying a specific mobile body.

DISCLOSURE OF THE INVENTION

In order to achieve the above objects, a received radio wave transmission equipment according to claim 1 is characterized by comprising:

a receiving antenna receiving a spectrum-spread up spread signal;

signal processing means for conducting a predetermined individual processing to said up spread signal received by said receiving antenna to obtain a down spread signal; and a transmission antenna transmitting said down spread signal to an external space.

According to claim 2, a received radio wave transmission equipment according to claim 1, is characterized in that said up spread signal is received on two or more line frequencies, and said signal processing means comprises frequency mixing means for giving a difference or a sum between said two or more line frequencies.

According to claim 3, a received radio wave transmission equipment according to claim 1, is characterized in that said signal processing means comprises phase delay means for delaying a phase of said up spread signal by a predetermined quantity.

Furthermore, according to claim 4, a received radio wave transmission equipment according to claim 1 is characterized in that said up spread signal is received on two or more line frequencies, said signal processing means comprises: frequency mixing means for giving a difference or a sum between said two or more line frequencies; and phase delay means for delaying a phase of said up spread signal by a predetermined quantity.

According to claim 5, a received radio wave transmission equipment according to claim 4, is characterized in that said phase delay means is provided in at least one of a front stage of said frequency mixer and a rear stage of said frequency mixing.

According to claim 6, a received radio wave transmission equipment according to any one of claims 1 to 5, is characterized in that a first bandpass filter having a predetermined frequency band is provided between said receiving antenna and said signal processing means.

Furthermore, according to claim 7, a received radio wave transmission equipment according to claim 6, is characterized in that said first bandpass filter is included in said receiving antenna.

According to claim 8, a received radio wave transmission equipment according to claim 2 or 4, is characterized in that a second bandpass filter having a predetermined frequency band is provided between said signal processing means and said transmission antenna.

According to claim 9, a received radio wave transmission equipment according to claim 8, is characterized in that said second bandpass filter is included in said transmission antenna.

According to claim 10, a received radio wave transmission equipment according to claim 1, is characterized in that said signal processing means consists of a passive element.

According to claim 11, a received radio wave transmission equipment according to claim 1 or 10, is characterized in that said signal processing means is incorporated in a printed wiring board.

According to claim 12, a received wave transmission equipment according to claim 1, 10 or 11, is characterized in that at least one of said receiving antenna and said transmission antenna is printed on a printed wiring board.

According to claim 13, a mobile body identification system is characterized by comprising:

a base station transmitting a spectrum-spread up spread signal, correlating the up spread signal with a received down spread signal, and capable of measuring the number of correlation peak points and values of the correlation peak points based on this correlation; and a mobile body receiving said up spread signal, conducting a predetermined individual processing to the up spread signal, and sending back the up spread signal as said down spread signal to said base station.

According to claim 14, a mobile body identification system according to claim 13, is characterized in that said up spread signal is transmitted on two or more line frequencies, and said down spread signal is sent back on a line frequency given by a difference or a sum between said two or more line frequencies.

According to claim 15, a mobile body identification system according to claim 13 or 14, is characterized in that said base station conducts correlation using a matched filter consisting of an SAW element.

According to claim 16, a mobile body identification system according to claim 13 or 14, is characterized in that said base station conducts correlation using a sliding correlater.

According to claim 17, a mobile body identification system according to any one of claims 13 to 16, is characterized in that said up spread signal is transmitted from two or more said base stations having different spreading codes, respectively.

According to claim 18, a mobile body identification system according to any one of claims 13 to 17, is characterized in that said up spread signal is transmitted from two or more said base stations having different line frequencies, respectively.

According to the invention of a received radio wave transmission equipment recited in claim 1, a receiving antenna receives a spectrum-spread up spread signal, signal processing means conducts a predetermined individual processing to the up spread signal received by the receiving antenna to obtain a down spread signal, and a transmission antenna transmits the down spread signal to an external space. By doing so, the down spread signal obtained by conducting predetermined individual processings to the up spread signal is emitted to the external space from the received radio wave transmission equipment. Therefore, the side which receives this down spread signal can know the presence of the received radio wave transmission equipment and a distance to the received radio wave transmission equipment by the correlation of the up spread signal with the down spread signal.

According to the invention of a received radio wave transmission equipment recited in claim 2, the signal processing means comprises frequency mixing means and this frequency mixing means gives a difference or a sum between the line frequencies of the received up spread signal on two or more line frequencies. It is thereby possible to individually process the line frequency of the down spread signal to a frequency of the difference or the sum of the line frequencies of the up spread signal. It is, therefore, possible to emit the down spread signal on the line frequency which is the difference or the sum of the line frequencies of the up spread signal from the received radio wave transmission equipment to the external space. Namely, frequency can be divided according to the difference or the sum of the line frequencies of the up spread signal.

According to the invention of a received radio wave transmission equipment recited in claim 3, the signal processing means comprises phase delay means and this phase delay means delays a phase of the up spread signal by a predetermined quantity. It is thereby possible to conduct an individual processing to delay the phase of the up spread signal by a predetermined quantity and, therefore, possible to emit a down spread signal delayed in phase from the up spread signal by a predetermined quantity from the received radio wave transmission equipment to the external space.

According to the invention of a received radio wave transmission equipment recited in claim 4, the signal processing means comprises frequency mixing means and phase delay means. The frequency mixing means gives a difference or a sum between the two or more line frequencies of the received up spread signal, and the phase delay means delays a phase of the up spread signal by a predetermined quantity. It is thereby possible to conduct an individual processing to the up spread signal to thereby set the line frequency of a down signal at the difference or the sum of the line frequencies of the up spread signal. In addition, since it is possible to conduct an individual processing to the up spread signal to delay the phase of the up spread signal by a predetermined quantity, it is possible to emit the down spread signal delayed in phase from the up spread signal by a predetermined quantity on a line frequency which is the difference or the sum of the line frequencies of the up spread signal to the external space. That is, it is possible to conduct both code division by delaying the phase of the up spread signal by a predetermined quantity and frequency division by the difference or the sum of the line frequencies of the up spread signal.

According to the invention of a received radio wave transmission equipment recited in claim 5, the phase delay means is provided in at least one of a front stage of the frequency mixing means and a rear stage of the frequency mixing means. It is thereby possible to conduct an individual processing to the up spread signal to delay the phase by a predetermined quantity in the front or rear stage of the frequency mixing means and, therefore, possible for the delay means to delay the phase of the up spread signal before or after or before and after the frequency mixing means obtains the difference or the sum of the line frequencies.

According to the invention of a received radio wave transmission equipment recited in claim 6, a first bandpass filter having a predetermined frequency band is provided between the receiving antenna and the signal processing means. As a result, among the up spread signals received by the receiving antenna, those on line frequencies higher or lower than the frequency band are prohibited from passing through the first bandpass filter. In other words, the up spread signals which can reach the signal processing means are limited to those pass through the frequency band.

According to the invention of a received radio wave transmission equipment recited in claim 7, the first bandpass filter is included in the receiving antenna. For example, by constituting the receiving antenna by the conductor pattern of a printed wiring board, the receiving antenna which has the characteristic of the first bandpass filter and which also functions as an antenna is formed. As a result, it is unnecessary to separately constitute the receiving antenna from the first bandpass filter, thereby making it possible to contribute to space saving.

According to the invention of a received radio wave transmission equipment recited in claim 8, a second bandpass filter having a predetermined frequency band is provided between the signal processing means and the transmission antenna. As a result, unnecessary radiations on frequencies higher or lower than the predetermined frequency band in the down spread signal subjected to a predetermined processing by the signal processing means, cannot pass through this second bandpass filter. That is, the frequency components of the down spread signal which can reach the transmission antenna are limited to those pass through the predetermined frequency band.

According to the invention of a received radio wave transmission equipment recited in claim 9, the second bandpass filter is included in the transmission antenna. For example, by constituting the transmission antenna by the conductor pattern of a printed wiring board, the transmission antenna can be constituted to have the characteristic of the second bandpass filter and to also function as an antenna. As a result, it is unnecessary to separately provide the transmission antenna from the second bandpass filter, making it possible to contribute to space saving.

According to the invention of a received radio wave transmission equipment recited in claim 10, since the signal processing means consists of a passive element, the received radio wave transmission equipment requires no power supply. It is thereby possible to realize a power supply-free device.

According to the invention of a received radio wave transmission equipment recited in claim 11, the signal processing means is incorporated in a printed wiring board. Itis, therefore, possible to make the received radio wave transmission equipment thin by a printed wiring board multi-layer technique or the like. It is thereby possible to suppress the user of the received radio wave transmission equipment from feeling strange even if the user contains the received radio wave transmission equipment in the pocket of the user's clothes. It is also possible to use the received radio wave transmission equipment by being bonded to a mobile body such as a vehicle.

According to the invention of a received radio wave transmission equipment recited in claim 12, at least one of the receiving antenna or the transmission antenna is printed on a printed wiring board. Therefore, compared with a case of constituting the received radio wave transmission equipment while separately providing the receiving antenna or the transmission antenna, it is possible to make the received radio wave transmission equipment thin and to stabilize the performance and quality of the antenna. It is thereby possible to suppress the user of the received radio wave transmission equipment from feeling strange even if the user contains the received radio wave transmission equipment in the pocket of the user's clothes and to improve the yield of the received radio wave transmission equipment.

According to the invention of a mobile body identification system recited in claim 13, a base station transmitting a spectrum-spread up spread signal, correlating the up spread signal with a received down spread signal, and capable of measuring the number of correlation peak points and values of the correlation peak points based on this correlation, and a mobile body receiving the up spread signal, conducting an individual processing to the up spread signal, and sending back the up spread signal as the down spread signal to the base station are provided. That is, the up spread signal transmitted from the base station is received by the mobile body. The mobile body which receives this up spread signal conducts a predetermined processing to the received up spread signal and sends back the spread signal as a down spread signal to the base station. The base station which receives this down spread signal correlates the transmitted up spread signal with the received down spread signal, and measures the number of correlation peak points and the values of the correlation peak points based on this correlation. It is thereby possible for the base station to know the presence of the mobile bodies each of which receives the up spread signal and sends back the spread signal as the down spread signal and the number of the mobile bodies from the number of correlation peak points.

According to the invention of a mobile body identification system recited in claim 14, the up spread signal is transmitted on two or more line frequencies, and the down spread signal is sent back on a line frequency given by a difference or a sum between the two or more line frequencies. It is thereby possible to conduct frequency division to the down spread signal by the difference or sum of the line frequencies of the up spread signal.

According to the invention of a mobile body identification system recited in claim 15, the base station conduct correlation using a matched filter consisting of an SAW element. It is thereby possible to simplify a constitution for correlating a plurality of up spread signals with a plurality of down spread signals, respectively, and to correlate them instantly. As a result, compared with a case of correlating the up spread signals with the down spread signals without using a matched filter consisting of an SAW element, it is possible to identify the mobile bodies even if there are many mobile bodies.

According to the invention of a mobile body identification system recited in claim 16, the base station conduct correlation using a sliding comparator. since the base station conducts correlation using the sliding correlator, the mobile body identification system is excellent in noise resistance if an up spread signal is correlated with a down spread signal. As a result, even if the up spread signal or the down spread signal contains much noise, it is possible to correlate the spread signals relatively easily.

According to the invention of a mobile body identification system recited in claim 17, the up spread signal is transmitted from two or more base stations having different spreading codes, respectively. That is, it is possible for the base stations to discriminate the mobile bodies to be identified among the received down spread signals according to the difference in spreading codes. As a result, each base station can appropriately select identifiable mobile bodies by arbitrarily setting the spreading codes of the up spread signals.

According to the invention of a mobile body identification system recited in claim 18, since the up spread signal is transmitted from two or more the base stations having different line frequencies, respectively, it is possible to discriminate mobile bodies to be identified from the received down spread signals according to the difference in line frequency. As a result, the base station can appropriately select identifiable mobile bodies by appropriately setting a line frequency.

BRIEF DESCRIPTION OF THE DRAWINGS

FIG. 4 is a block diagram of a printed board which constitutes the identification card in the mode for carrying out the present invention, wherein FIG. 4(A) is a plan view and FIG. 4(B) is a cross-sectional view taken along line 4B—4B of FIG. 4(A);

BEST MODE FOR CARRYING OUT THE INVENTION

One mode for carrying out a mobile body identification system to which a received radio wave transmission equipment and a mobile body identification system according to the present invention are applied will be described hereinafter with reference to the drawings.

Figure 1:
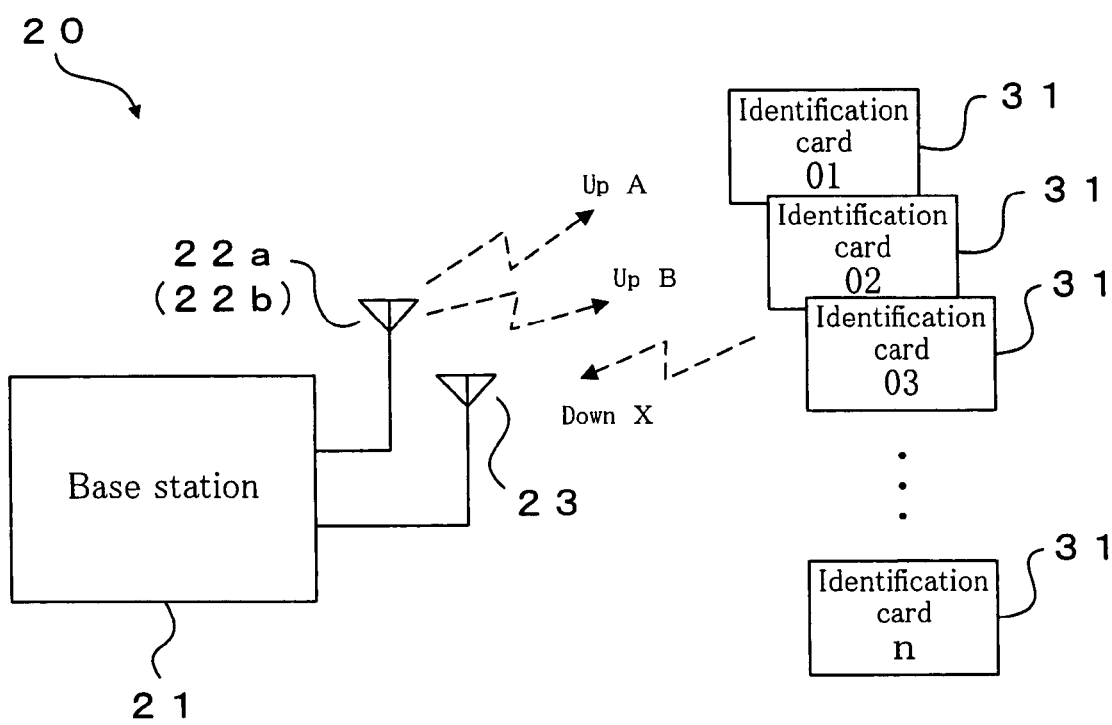
FIG. 1 is a schematic block diagram showing a mobile body identification system in one mode for carrying out the present invention.

As shown in FIG. 1, a mobile body identification system 20 in this mode for carrying out the invention basically consists of one base station 21 and a plurality of (1 to n) identification cards 31. In FIG. 1, reference symbols 22a and 22b denote transmission antennas of the base station 21 and reference symbol 23 denotes the receiving antenna thereof.

First, the configuration of the base station 21 will be described based on FIGS. 1 and 2.

Figure 2:
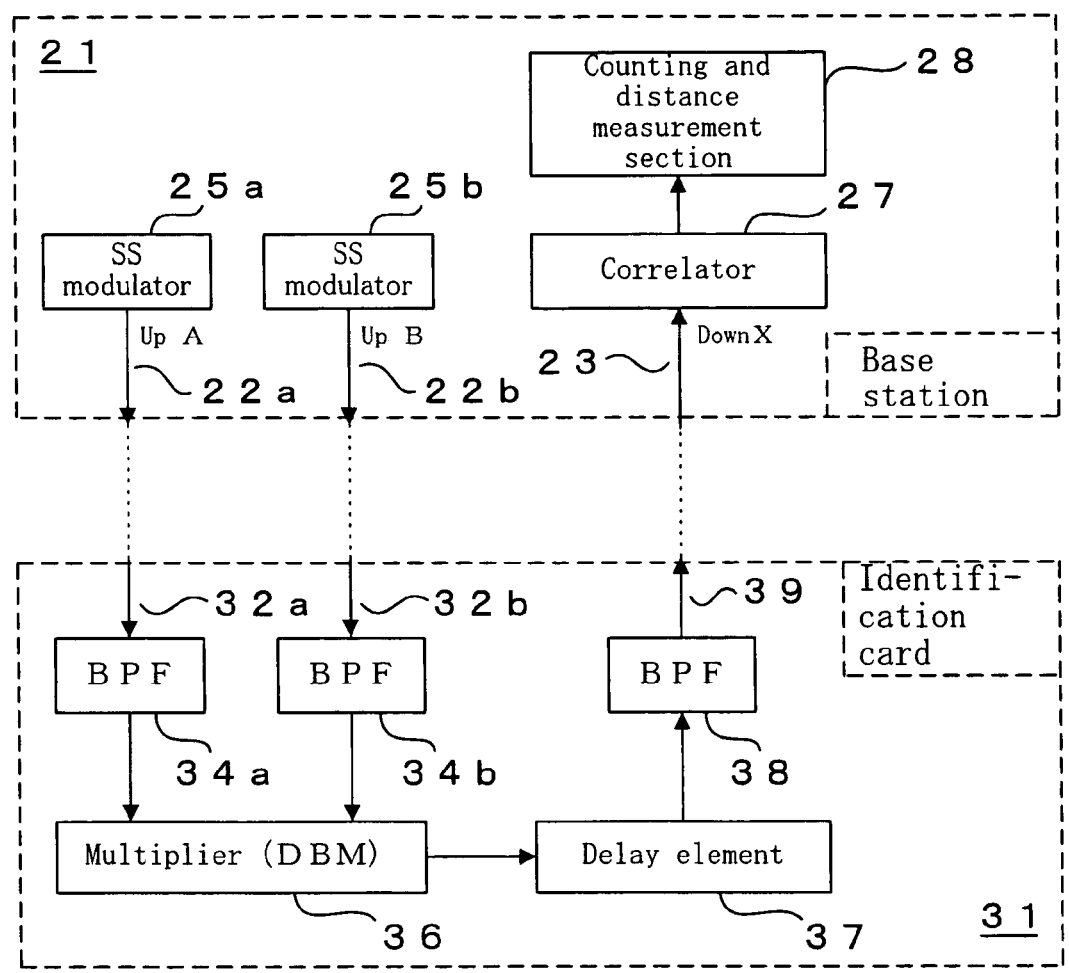
FIG. 2 is a block diagram showing the functional configuration of the mobile body identification system in the mode for carrying out the present invention.

As shown in FIG. 2, the base station 21 mainly consists of transmission antennas 22a and 22b, a receiving antenna 23, SS modulators 25a and 25b, a correlator 27, and a counting and distance measurement section 28.

As shown in FIG. 1, the transmission antennas 22a and 22b are constituted to be able to emit high frequency waves in a predetermined frequency band to external space. The transmission antennas 22a and 22b are provided to correspond to the SS modulators 25a and 25b, respectively.

That is, the transmission antennas 22a and 22b are set to have usable frequency bands which are adaptable to the line frequencies (A channel and B channel) of up spread signals to be described later.

As stated above, the transmission antennas 22a and 22b are provided to correspond to the SS modulators 25a and 25b, respectively. However, if there is provided an antenna which has a frequency band which contain the line frequencies (A channel and B channel) of the SS modulators 25a and 25b, respectively, there is no need to provide two different antennas but one antenna may be constituted to correspond to both the SS modulators 25a and 25b.

Meanwhile, the receiving antenna 23 is constituted to be able to receive down spread signals sent back by the identification cards 31 and provided to correspond to the correlator 27. Due to this, the usable frequency band of this receiving antenna 23 is set to be adaptable to the line frequencies (X channel) of the down spread signals to be described later.

The SS modulator 25a is constituted to be able to generate an up spread signal which is spectrum-spread by a predetermined spreading code. The SS modulator 25a consists of, for example, a PN code generator, a high frequency signal generator, a frequency mixer and the like.

In other words, the SS modulator 25a is constituted so that the frequency mixer mixes a predetermined spreading code output from the PN code generator and an A channel frequency signal output from the high frequency signal generator, whereby the A channel high frequency signal is subjected to spectrum spread modulation using a predetermined spreading code and an up spread signal can be generated.

The SS modulator 25b is constituted in a similar manner to the SS modulator 25a. The SS modulator 25b consists of, for example, a PN code generator, a high frequency signal generator, a frequency mixer and the like so as to be able to generate an up spread signal which is spectrum-spread by a predetermined spreading code.

The PN code generator which constitutes each of the SS modulators 25a and 25b is constituted to be able to arbitrarily set the code pattern of a spreading code sequence to be generated. Due to this, in this mode for carrying out the invention, a code pattern setting changes according to spreading code sequences so that an up spread signal on the A channel differs from that on the B channel. By doing so, the base station 21 can discriminate the identification card 31 which sends back the up spread signal transmitted from the base station 21 as a down signal, i.e., the identification card 31 to be identified from the other identification cards 31.

The correlator 27 correlates the transmitted up spread signal with the down spread signal sent back by the identification card 31 which receives the up spread signal, and consists of, for example, a matched filter comprised of SAW (Surface Acoustic Wave) elements. Due to this, compared with a case of correlating an up spread signal with a down spread signal using a sliding correlator, the correlator 27 can instantly correlate them for one code cycle. The correlation value obtained by this correlator 27 is output to the counting and distance measurement section 28.

If the line quality of up or down spread signals is exposed to deteriorated environment, the sliding correlator may be used to correlate the up and down spread signals with each other for the following reason. The sliding correlator is superior in noise resistance to the matched filter comprised of the SAW elements.

The counting and distance measurement section 28 is located in the rear stage of the correlator 27 and consists of, for example, a microcomputer so as to be able to analyze a correlation value output obtained by the correlator 27.

Namely, the number of correlation peak points and the values of the respective correlation peak points are measured based on the correlation value output of the correlator 27. The identification target identification cards 31 are counted from the number of correlation peak points which exceed a preset threshold. In addition, distances from the base station 21 to the identification cards 31 are measured from the respective values of correlation peak points by distance measurement expressions (6) and (7) to be described later. As a result, it is possible to measure the number of mobile bodies which includes specific identification cards 31 and the distances from the base station 21 to the specific mobile bodies.

This threshold is set in consideration of the influence of noise components included in channel frequencies. If there is no influence of noise components, it is unnecessary to set the threshold.

By constituting the base station 21 as stated above, the mobile body identification system 20 in this mode for carrying out the invention can perform the following basic operations.

That is, at the base station 21, the SS modulators 25a and 25b generate spread-spectrum spread signals, respectively, and up spread signals having different channel frequencies are transmitted on the two channels, A channel and B channel by the transmission antennas 22a and 22b (which up spread signals are denoted by "up A" and "up B" shown in FIG. 1), respectively. On the other hand, as will be described later, the up spread signals thus transmitted are subjected to predetermined individual processings by the specific identification cards 31, and sent back as down spread signals (which down spread signals are denoted by "down X" in FIG. 1) on a down X channel (which is a synthetic radio wave of an A channel wave and a B channel wave). As a result, the base station 21 receives the sent-back down spread signals at the receiving antenna 23. Thereafter, at the base station 21, the correlation value calculation section 27 correlates the waveforms of the up spread signal already transmitted with the waveforms of the down spread signal, respectively, and the counting and distance measurement section 28 can, therefore, count the identification cards 31 which send back the down spread signals on the X channel. Further, it is possible to measure distances from the base station 21 to the identification cards 31, respectively.

The configuration of the identification card 31 will next be described based on FIGS. 2 to 4.

Figure 3:
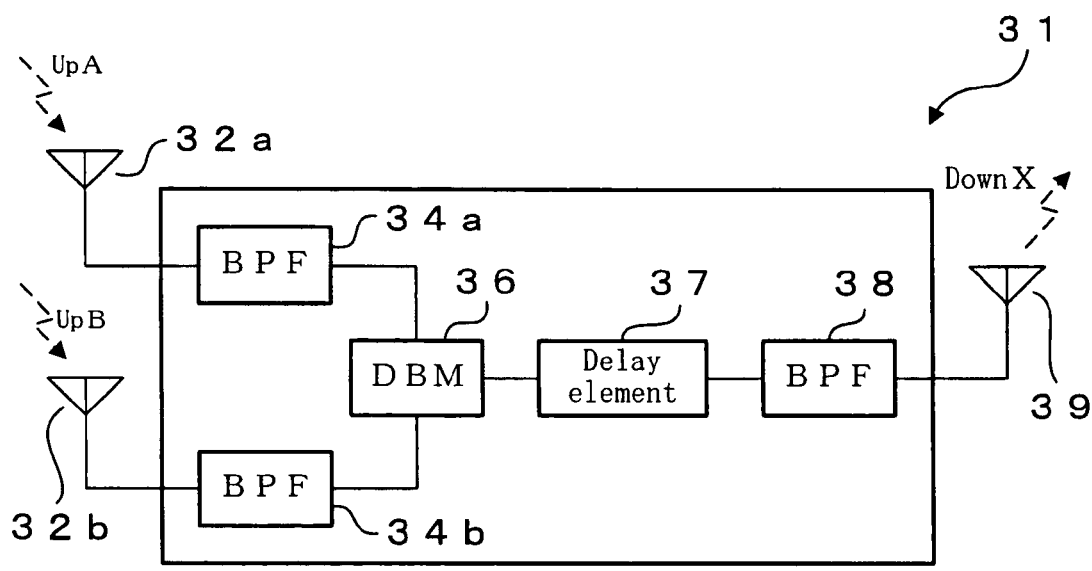
FIG. 3 is a block diagram showing the configuration of an identification card in the mode for carrying out the present invention.
Figure 4:
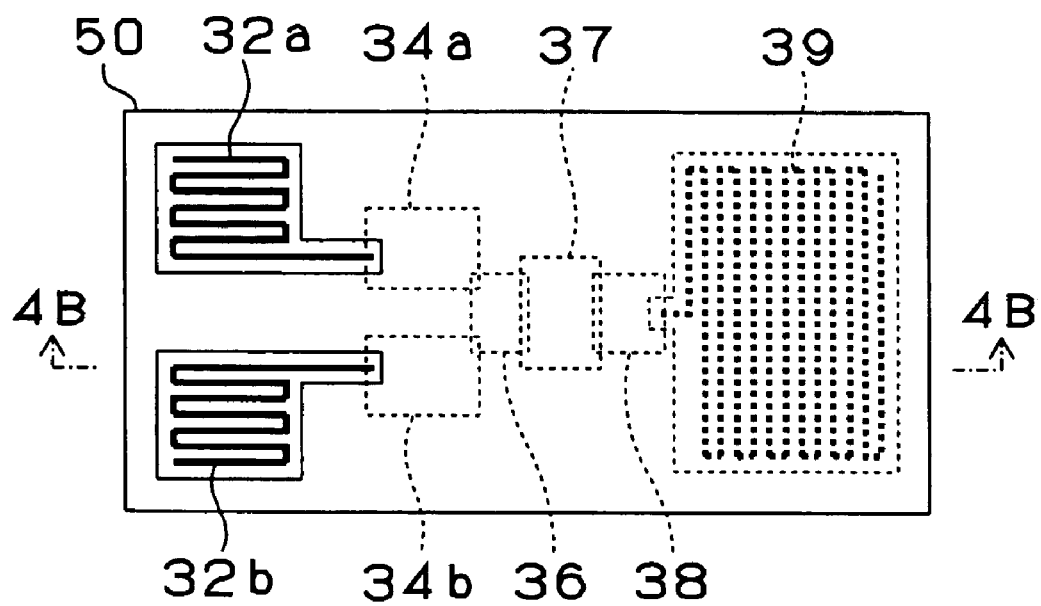
Figure 4:
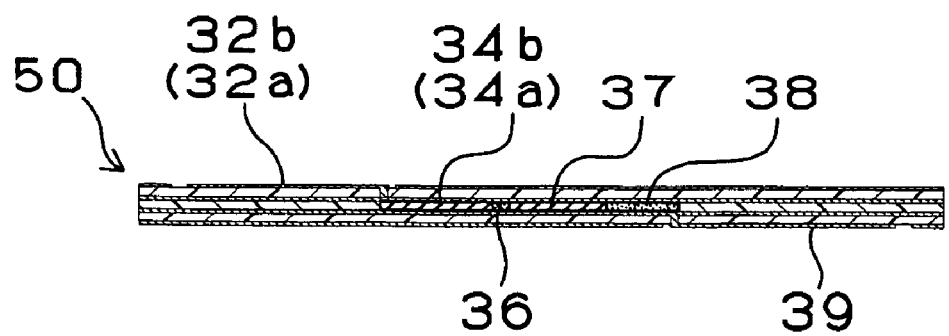

As shown in FIG. 3, each identification card 31 mainly consists of receiving antennas 32a and 32b, BPFs 34a and 34b, a DBM 36, a delay element 37, a BPF 38 and a transmission antenna 39. The receiving antennas 32a and 32b receive spectrum-spread up spread signals, respectively, the DMB 36 and the delay element 37 conduct predetermined individual processings to the up spread signals to obtain a down spread signal, and the transmission antenna 39 emits the down spread signal to external space.

As will be described hereinafter, since these constituent elements of the identification card 31 are passive elements, they will not need any power supply. It is thereby possible to realize the identification card 31 as a power supply-free device without a power supply. Accordingly, it is possible to easily realize a light, thin and small-sized identification card 31 because of no need of a power supply. Since it is unnecessary to replace batteries, it is possible to easily realize a maintenance-free identification card 31.

The shapes, lengths and the like of the receiving antennas 32a and 32b are set so as to satisfactorily receive radio waves on the up A and B channels, respectively.

As shown in FIGS. 4(A) and 4(B), these receiving antennas 32a and 32b are formed by, for example, a print pattern printed on one surface of a printed board 50 which constitutes the identification card 31. Therefore, compared with a case where the receiving antennas 32a and 32b are constituted as separate components, it is possible to form a thin identification card 31 and to stabilize the performance and quality of antennas. Accordingly, it is possible to suppress the user of the identification card 31 from feeling strange even if the user carries the identification card 31 in the pocket of the user's clothes and to improve the yield of the identification cards 31.

It is noted that the receiving antennas 32a and 32b need no driving power supply.

The BPF 34A is an LC type bandpass filter in which the value of a coil and that of a capacitor, for example, are set so that the BPF 34A has a predetermined frequency band. The BPF 34A is located in a rear stage of the receiving antenna 32a.

Namely, the BPF 34a permits the passage of high frequency components of the spread signal received by the receiving antenna 32a in a predetermined frequency band centered around the center frequency of the A channel, and prohibits the passage of those on channel frequencies higher or lower than this frequency band. Due to this, the BPF 34a functions to select an up spread signal in a predetermined frequency band set by the BPF 34a and to output the selected up spread signal to the DBM 36 provided in a rear stage of the BPF 34a.

Likewise, the BPF 34b located in a rear stage of the receiving antenna 32b is a bandpass filter having a predetermined frequency band. That is, the BPF 34b permits the passage of high frequency components of the spread signal received by the receiving antenna 32b in a predetermined frequency band centered around the center frequency of the B channel, and prohibits the passage of those on channel frequencies higher or lower than this frequency band. Due to this, the BPF 34b functions to select an up spread signal in the predetermined frequency band set by the BPF 34b and to output the selected up spread signal to the DBM 36 in the rear stage of the BPF 34b.

By providing such BPFs 34a and 34b in the rear stage of the receiving antennas 32a and 32b, i.e., between the receiving antennas 32a and 32b and the DBM 36, respectively, it is possible to constitute the identification card 31 so as to be able to send back a down spread signal only for the up spread signal having specific channel frequency (A and B channels in this mode for carrying out the invention).

Further, as shown in FIGS. 4(A) and 4(B), the BPFs 34a and 34b are constituted in the printed board 50. Specifically, a chip capacitor (C) is incorporated in the printed board 50 and a coil pattern (L) is formed in the intermediate layer of the printed board 50 as a print pattern, for example. Alternatively, the coil (L) may be formed by incorporating a chip inductor in the printed board 50. By so constituting, it is possible to a light, thin and small-sized identification card 31. In addition, since the component which constitutes each of the BPFs 34a and 34b is a capacitor equal to the coil as a passive element, it needs no driving power.

The BPFs 34a and 34b may be constituted to be included in the receiving antennas 32a and 32b, respectively. For example, if the BPFs 34a and 34b are formed by the print pattern of the printed board 50 on which the receiving antennas 32a and 32b are formed, the receiving antenna 32a also serves as the BPF 34a and the receiving antenna 32b also serves as the BPF 34b. In this way, it is possible to constitute a component which has the functions of both an antenna and a BPF. As a result, it is possible to provide a component which has the performance of a BPF and which also serves to have the performance of an antenna or to provide a component which has the performance of an antenna and which also serves to have the performance of a BPF. It is thereby possible to contribute to space saving. Consequently, it is possible to easily realize a light, thin and small-sized identification card 31.

The DBM 36 is a double balanced mixer which is a kind of a frequency mixer. This DMB 36 is located in a rear stage of the BPFs 34a and 34b, multiplies the up spread signals on two line frequencies output from the BPFs 34a and 34b, respectively, by each other and outputs a multiplied spread signal to the delay element 37 in a rear stage of the DBM 36. As a result, the two up spread signals are frequency-transformed to a spread signal having a frequency of the difference or sum of the both line frequencies and code-transformed to a spread signal having a spreading code obtained by the multiplication of the spread signals.

In other words, by conducting predetermined individual processings to the up spread signals by the DBM 36, respectively, a down spread signal having characteristic conditions is output to the base station 21 from the DBM 36. Accordingly, in this mode for carrying out the invention, for example, since the frequency corresponding to the difference between the A channel and the B channel is set as the X channel line frequency and the a spread signal which has been transformed is output on this frequency to the delay element 37, the necessary condition of the base station 21 is the ability to receive the X channel.

Further, the double balanced mixer is a module of a passive element which consists of four diodes and two coils. Due to this, compared with a case of constituting a frequency mixer out of a active element such as a transistor, the double balanced mixer cannot obtain transform gain. However, as in the case of the BPFs 34a and 34b stated above, since the double balanced mixer needs no driving power, this mixer is advantageous in that the identification card 31 can be constituted as a power supply-free device.

As shown in FIGS. 4(A) and 4(B), since the DBM 36 used in this mode for carrying out the invention is constituted in the printed board 50, the DBM 36, in cooperation with the BPFs 34a and 34b, contributes to making the identification card 31 light, thin and small in size.

The delay element 37 functions to delay the phase of an up spread signal by a predetermined quantity and a delay line, for example, is used as the delay element 37. Delay time generated by this delay element 37 is set to differ among the individual identification cards 31.

Specifically, if the code speed of two spread signals to be received is set at, for example, 10 MHz, the speed of a chip interval is 0.1 µS and the delay time is set to be n times (where n=1, 2, 3, . . . ) as high as 0.2 µS, i.e., 0.2 µS, 0.4 µS, 0.6 µS, . . . or the like.

By so setting, when the spread signal on the X channel which has been frequency-transformed and code-transformed by the DBM 36 passes through this delay element 37, the spread signal is output from the delay element 37 with a delay by as much as the individually set predetermined time. That is, the spread signal on the X channel is delayed in phase by a predetermined quantity by the delay element 37, whereby the spread signal is subjected to a predetermined individual processing to have ID information and output from the delay element 37 as a down spread signal.

This delay element 37 may be provided in a front stage of the DBM 36, i.e., between the BPF 34a and the DBM 36 or between the BPF 34b and DBM 36, or may be provided both between the BPF 34a and the DBM 36 and between the BPF 34b and the DBM 36. It is also possible to provide the delay elements 37 in front and rear stages of the DBM 36, respectively, so as to put the DBM 36 between the delay elements 37. As a result, it is possible to increase the variation of the individual processing depending on a combination of the location of the delay element 37 and the delay quantity thereof, making it possible to complicate the individual processing. Accordingly, such individual processing can be used as "characteristic ID information" given to each identification card 31.

The reason for setting different delay time for the respective identification cards 31 and generating phase delays different among the identification cards 31 is as follows. By affording individual conditions to the identification cards 31, as descried later, it is possible for the base station 21 to identify a specific identification card 31 by the received down spread signal.

This delay element 37 is similarly constituted out of a passive element and provided in the printed board 50 as shown in FIGS. 4(A) and 4(B). Due to this, the delay element 37 contributes to making the identification card 31 light, thin and small-sized and power supply free.

The BPF 38 is a bandpass filter which is provided in a rear stage of the delay element 37, i.e., between the delay element 37 and the transmission antenna 39 and which is constituted almost similarly to the BPFs 34a and 34b. That is, the parameters of the LC are set so as to permit the passage of high frequency components in a predetermined frequency band centered around the center frequency of the line frequency (X channel) on which the down spread signal phase-delayed by the delay element 37 is carried, and to prohibit the passage of those on line frequencies higher or lower than this frequency band. Due to this, the BPF 38 can eliminate unnecessary frequency components included in the down spread signal and, therefore, improve the signal quality of the down spread signal.

As shown in FIGS. 4(A) and 4(B), this BPF 38 is similarly constituted out of a passive element and provided in the printed board 50, thereby contributing to making the identification card 31 light, thin and small in size and power supply free.

The transmission antenna 39 is located in a rear stage of the BPF 38. The shape, the length and the like of the transmission antenna 39 are set to be able to ensure good emission of the radio wave of the down spread signal on the X channel to external space. This transmission antenna 39 needs no driving power, either.

As shown in FIGS. 4(A) and 4(B), this transmission antenna 39 is formed by, for example, a print pattern printed on the other surface of the printed board 50 which constitutes the identification card 31. It is thereby possible to provide the transmission antenna 39 on the surface of the board opposite to that on which the receiving antennas 32a and 32b are formed while a solid earth pattern formed in the intermediate layer of the printed board 50 is put therebetween. Therefore, it is possible to separate a receiving side from a transmission side according to high frequencies. Further, since the transmission antenna 39 is constituted as a print pattern on the board, the identification card 31 can be made thinner than that constituted to form the transmission antenna 39 as a separate component. In addition, it is possible to stabilize the performance and quality of the antenna. Accordingly, it is possible to suppress the user of the identification card 31 from feeling strange even if the user carries the identification card 31 in the pocket of the user's clothes and to improve the yield of the identification cards 31.

Alternatively, the BPF 38 may be constituted to be included in the transmission antenna 39. For example, if the BPF 38 is formed out of the print pattern of the printed board 50 which forms the transmission antenna 39, it is possible to constitute the BPF 38 which also serves the transmission antenna 39 or the transmission antenna 39 which also serves as the BPF 38, i.e., it is possible to constitute a component which functions as both an antenna and a BPF. In this way, it is possible to constitute a component which has the performance of a BPF and which also serves to have the performance of an antenna or to a component which has the performance of an antenna and which also serves to have the performance of a BPF. It is thereby possible to contribute to space saving. Consequently, it is possible to easily realize a light, thin and small-sized identification card 31.

By constituting the identification card 31 as stated above, the identification card can conduct the following operations to the up spread signals transmitted from the base station 21.

If the receiving antennas 32a and 32b receive the up spread signals (on the A channel and the B channel) transmitted from the base station 21, respectively, the BPFs 34a and 34b select the up spread signal on the A channel and that on the B channel, respectively, and the two up spread signals are multiplied by each other by the DBM 36. As a result, the up spread signals are frequency-transformed to a spread signal having an X channel line frequency corresponding to the frequency difference between the A and B channels and code-transformed to have a spread coding corresponding to the product of the spreading code of the up spread signal on the A channel and that on the B channel. The phase of the spread signal thus transformed is delayed by a predetermined quantity by the delay element 37, thereby completing "predetermined processings conducted to the up spread signals" and obtaining a down spread signal having individual ID information. The down spread signal is emitted to external space by the transmission antenna 39 through the BPF 38. As a result, the down spread signal obtained by conducting predetermined individual processings to the up spread signals on the A channel and the B channel is emitted on the X channel. Therefore, as already described above, the base station 21 receives down spread signals on the X channel, whereby it is possible to count identification cards 31 which send back such spread signals to the base station 21 and to measure distances from the base station 21 to the respective identification cards 31.

Next, an example of a system for transmitting up spread signals from the base station 21 on so-called weak radio waves will be described based on FIGS. 1, and 5 to 7.

Until now, a case of applying the mobile body identification system 20 according to the present invention to "an on-demand system" in which the number of bus passengers waiting at a bus station or a distance from a bus which is running on the road to the passenger waiting at the bus station is grasped at real time, whereby the bus starts to the bus station when, for example, people gather at the bus station, will be described.

It is assumed herein that the base station 21 shown in FIG. 1 is installed in a bus and that the identification card 31 is carried by each passenger waiting for the bus with the card 31 put in the pocket of clothes, a handbag, a bag or the like of the passenger.

First, when the identification card 31 which the passenger carries receives up spread signals on the A and B channels, respectively, from the base station 21, a down spread signal obtained by delaying the phase of the spread signal to correspond to the ID information of each identification card 31 by the delay element 37 constituting the identification card 31 is sent back as a spread spectrum wave on the X channel to the base station 21.

For instance, in FIG. 1, the identification card 01 (identification card 31) sends back a spread signal delayed in phase by one bit to the base station 21, and the identification card 03 (identification card 31) sends back a spread signal delayed in phase by three bits to the base station 21. That is, users waiting for the bus near the bus station are automatically counted as bus passengers by the base station 21 only if the users carry the respective identification cards 31 without the need to perform special operation.

Now, the power of the spread spectrum signal wave transmittable from the base station 21 according to this system will be considered. That is, to transmit an up spread signal within the category of "weak radio waves" which does not require a license, from the base station 21 without any restrictions of the radio wave law, it is necessary to transmit the spread signal on a wave having not higher than certain power.

High frequency power allowed to this end can be obtained from a field intensity approximation expression determined by the power which can be supplied to a $\lambda/2$ dipole antenna. According to this expression, the allowed high frequency power is about $-43.4$ dBm ($4.6 \times 10^{-8}$ W) (0 dBm=1 mW).

It is noted that the present system can be applied to an easily available frequency band, such as the ISM (Industrial Scientific and Medical) band, by using the spread spectrum method. In addition, by using the spread spectrum method, communication power can be effectively utilized, so that such the spectrum spread method is advantages to such communication held with low transmission power as that by the present system.

Due to this, if the minimum necessary power of the identification card 31 at the base station 21, i.e., the receiving sensitivity of the base station 21 is −100 dBm, it is necessary to take account of power attenuation, which is the difference between the high frequency power and the weak power, of −56.6 dBm. Furthermore, it is necessary to take account of the power attenuation of the identification card 31.

Accordingly, if a measurable distance is calculated using the following expression (1), the following result as shown in the next Table 1 is obtained.

$$E = \frac{7\sqrt{P}}{r} (V/m) \quad (1)$$

In the expression (1), P denotes power (W) and r denotes distance (m).

TABLE 1

| Power attenuation (dB) at card | Measurable distance (m) |
|---|---|
| 0 | 2029 |
| −10 | 642 |
| −20 | 203 |
| −30 | 62 |

According to Table 1, for example, if the power attenuation at the identification card 31 is set at −30 dB (−5 dB for each of the receiving antenna 32a, the BPFs 34a and 34b, the DBM 36, the delay element 37, the BPF 38 and the transmission antenna 39, i.e., −5 dB×6=−30 dB), a round-trip measurable distance amounts to 64 meters.

As a result, the up spread signal which can be transmitted from the base station 21 within the category of weak radio waves is transmitted from the base station 21 and goes through the identification card 31 and the wave of the up spread signal is received by the base station 21. It is, therefore, understood that a distance up to ½×64 m or 32 m can be measured.

In addition, as already described above, the identification card 31 which each user of this system carries, has an individual phase delay, i.e., a shifted PN code as ID information in the same sequence. Therefore, if the identification card 31 receives the up spread signal from the base station 21, the identification card 31 sends back the PN code with a phase corresponding to the individual ID information to the base station 21. As shown in, for example, Table 2, the identification card n of a user n holds a PN code $PN_{2n-1}$ as ID information.

TABLE 2

| PN code | |
|---|---|
| PN1 | User 1 ID information |
| PN2 | |
| PN3 | User 2 ID information |

TABLE 2-continued

| PN4 | |
|---|---|
| PN5 | User 3 ID information |
| . | . |
| . | . |
| . | . |
| Correlation value | |
| a1 | User 1 correlation value |
| a2 | |
| a3 | User 2 correlation value |
| a4 | |
| a5 | User 3 correlation value |
| . | . |
| . | . |
| . | . |

As shown in Table 2, the reason for allocating PN codes every other code is to eliminate the influence of the correlation values from the identification cards 31 carried by the other users, as will be described later. Due to this, the ID information can be allocated by as much as (PN code length to be used)/2.

Now, the counting of the counting and measurement section 28 which constitutes the base station 21 will be described. The counting can be made by obtaining the correlation values of the received down spread signals with the waveforms (up spread signals) which serve as the individual ID information held by the base station.

Figure 5:
FIG. 5 is a waveform view showing one example of the waveforms of a signal transmitted and received from and to a base station in the mode for carrying out the invention.
Figure 5:
Figure 5:
Figure 5:
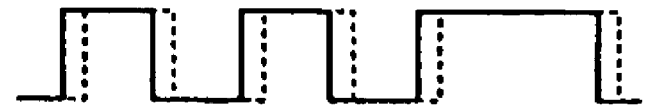

First, as shown in FIG. 5, the base station 21 holds, as a reference waveform, a spread signal (FIG. 5(B)) shifted by a half bit from the PN code serving as each ID information (FIG. 5(A)). The identification card 31 obtains the correlation value of the reference waveform (FIG. 5(B)) with the waveform to be sent back so as to send back the down spread signal (FIG. 5(A)) serving as the ID information thereof to the base station 21.

The reference waveform is shifted by a half bit because a single correlation value can cover a longer distance. That is to say, the waveforms shown in FIGS. 5(C) and 5(D) are each shifted from the reference waveform by b/4 (m) in a phase advancing direction or a phase delay direction and have, therefore, the same correlation value. But in fact, the distances from the base station 21 are different. Due to this, using the spread signal corresponding to the respective pieces of ID information as a reference waveform, correlation values of the reference waveform with synthetic waveforms transmitted from the respective devices are calculated (see Table 2).

Further, the reason for allocating PN codes corresponding to the respective ID information every other code is to prevent the leakage of a correlation value. That is, the waveform shown in FIG. 5(C) has a correlation value 0.75 and remaining 0.25 is leaked to the prior PN code. In other words, if the PN codes are not allocated every other code, the correlation value of a certain identification card 31 is influenced by the correlation values from the prior and posterior PN codes of the identification cards 31 carried by the other users and the correlation value differs from the actual correlation value corresponding to the ID information of the identification card 31 carried by the certain user.

In the environment free from noise and distance-caused attenuation, if spread signals are the same, the correlation value becomes 1, and if one spread signal is shifted by a half bit from the other spread signal, the correlation value becomes 0.5. Actually, however, since the environment in which noise and distance-caused attention exist should be taken into consideration, it is necessary to set a threshold. For that reason, the counting and measurement section 28 of the base station 21 according to the present system is set so that if correlation values among (code length)/2 correlation values are not smaller than the threshold, correlation peak points are counted as the number of the identification cards having the ID information.

Furthermore, as already described above, if a measurable distance is determined from the power attenuation generated in the identification card 31, the code speed of the up spread signal transmitted from the base station 21 can be determined based on the distance.

According to the present system, for example, since the measurable distance is set at 32 meters, it is possible to allow a phase delay by as much as two bits of PN codes until time corresponding to the round-trip distance 64 meters of the measurable distance. Accordingly, if speed of light is $3.0 \times 10^8$ (m/s), the code speed can be set up to $300/(64/2)=9.375$ (MHz) according to the present system.

Namely, as the code speed is set faster, the measurable distance becomes shorter. However, it is possible to shorten count time required in one measurement. If the code speed is set at, for example, 10 MHz, the measurable distance is 30 meters. However, since count time required in one measurement is 2 µS, it is possible to identify 500,000 identification cards per second.

Accordingly, the code speed of the up spread signal from the base station 21 is determined by considering both the measurable distance and the time required for the measurement or the number of identified cards.

Next, the distance measurement of the counting and measurement section 28 which constitutes the base station 21 will be described. The distance is calculated based on the correlation value used in the counting.

The down spread signal sent back to the base station 21 changes its correlation value according to distance-caused attenuation, phase difference and noise. Due to this, the distance-caused attenuation and the phase difference are corrected using the following expressions (2) and (3) and then the distance is measured based on the corrected distance-caused attenuation and phase difference. It is assumed herein that the distance-caused power attenuation is inversely proportional to the square of a distance.

$$a = \frac{1}{x_f^2}\left(\frac{1}{2} + \frac{1}{b}x_f\right) \quad (2)$$

$$a = \frac{1}{x_b^2}\left(\frac{3}{2} - \frac{1}{b}x_b\right) \quad (3)$$

In the expressions, $x_f$ denotes a distance (m) away from the base station in one direction, $x_b$ denotes a distance (m) away from the base station in the other direction, a denotes a correlation value for a down spread signal (ID information) and b denotes the wavelength (m) of a PN code of one bit.

The expressions (2) are (3) are given while considering the distance-caused attenuation and the phase difference of waveforms which may influence a correlation value in a noise-free environment. There are two expressions to be used because, as already described above, the correlation value is obtained using a spread signal shifted by a half bit as a reference waveform (FIG. 5(B)) and the same correlation value covers a longer distance.

Further, the expression (2) represents that the distance is shorter than b/2 (m) and the expression (3) represents that the distance is longer than b/2 (m).

Here, since a and b are well-known, the expressions (2) and (3) can be changed to quadratic equations (4) and (5) as follows with a distance from the base station 21 set as a variable.

$$ax_f^2 - \frac{1}{b}x_f - \frac{1}{2} = 0 \quad (4)$$

$$ax_b^2 + \frac{1}{b}x_b - \frac{3}{2} = 0 \quad (5)$$

Using the equations (4) and (5), two solutions are obtained from each equation. These solutions are represented by the following expressions (6) and (7), respectively.

$$x_f = \frac{\frac{1}{b} \pm \sqrt{\left(-\frac{1}{b}\right)^2 + 2a}}{2a} \quad (6)$$

$$x_b = \frac{-\frac{1}{b} \pm \sqrt{\left(\frac{1}{b}\right)^2 + 6a}}{2a} \quad (7)$$

If the correlation value is assumed positive, positive and negative solutions are obtained from the expressions (6) and (7), respectively. Since a negative distance does not actually exist, two solutions are obtained from the two quadratic equations. By selecting one of the two solutions, an optimum solution is set as an output distance. The expression (1) represents a distance is shorter than a half bit and the expression (2) represents that a distance is longer than the half bit. The two solutions satisfy the following expressions (8) and (9).

$$\frac{\frac{1}{b} + \sqrt{\left(-\frac{1}{b}\right)^2 + 2a}}{2a} < \frac{b}{2} \Rightarrow a(ab^2 - 4) > 0 \quad (8)$$

$$\frac{-\frac{1}{b} + \sqrt{\left(\frac{1}{b}\right)^2 + 6a}}{2a} < \frac{b}{2} \Rightarrow a(ab^2 - 4) > 0 \quad (9)$$

If one of the two solutions is not greater than b/2 (m), the other solution is not greater than b/2 (m). That is, if the both solutions are not greater than b/2 (m), the solution of the equation (4) is selected and if the both solutions are not smaller than b/2 (m), the solution of the equation (5) is selected, whereby an optimum solution can be obtained.

There are cases where no solutions exist from the following solution discriminants (10) and (11). Since the correlation value does not become negative in the noise-free environment, these cases are considered to be influenced by noise.

$$D = \left(-\frac{1}{b}\right)^2 - 4 \cdot a \cdot \left(-\frac{1}{2}\right) \Rightarrow a < -\frac{1}{2b^2} \quad (10)$$

$$D = \left(\frac{1}{b}\right)^2 - 4 \cdot a \cdot \left(-\frac{3}{2}\right) \Rightarrow a < -\frac{1}{6b^2} \quad (11)$$

According to the expression (10) and (11), the case where no solutions are obtained occurs in the expression (5) prior to the expression (4). In these cases, therefore, the solution of the expression (4) is selected as an optimum solution.

Next, a result of simulating the counting and distance measurement of the present system using a calculator will be described.

[1] Simulation Conditions

Simulation conditions using the calculator will first be described with reference to Table (3) below.

TABLE 3

| Spreading code | Non-correlated code by adding 1 bit to the end of PN code of 255-bit length (m sequence) |
|---|---|
| Spreading speed | 10 MHz |
| Speed of light | $3.0 \times 10^8$ (m/s) |
| Minimum necessary power of receiver | −100 dBm |
| Measurable distance | 60 m (one-way 30 m) |
| Measurement accuracy | 30 cm |
| Noise | White random noise |
| Distance-caused power attenuation | Inversely proportional to square |
| Counting threshold | 1/2200 |

It is assumed herein that the PN code is an M sequence PN code and the code length thereof is 255 bits. It is also assumed herein that code speed is 10 MHz and speed of light is $3.0\times10^8$ (m/s). That is, since the distance becomes 30 m which corresponds to one wavelength herein, a measurable distance range is set to fall within 0 to 30 m. This is because the distance up to 32 m from the base station 21 is measurable in the category of weak radio waves as already described above.

To decrease distance error, the non-correlated code obtained by adding "0" to the final bit of the PN code is used. If an ordinary PN code is used, the correlation value becomes 1 at an origin and −1/(code length) at the other points. However, by adding "0" to the end of the PN code, the correlation value can be made 0 at the other points. Therefore since the PN code length is 255+1, 128 multi-connections can be established.

Considering the density of users (30 cm² per user), a resolution 100 is provided for a PN code of one bit and the distance accuracy is set at 30 cm. The distance-caused power attenuation is inversely proportional to the square of the distance. 100 simulations are performed and the average of the simulations is obtained as a simulation result.

In addition, a counting threshold is assumed as 1/2200 for the following reason. If considering maximum distance-caused attenuation of 1/30², a minimum correlation value change 0.5 according to phase and noise insertion, the threshold should be not greater than 1/1800. However, if the threshold is too great, users who actually exist in an area are not sometimes counted. On the contrary, if the threshold is too small, users who do not actually exist in the area are sometimes counted.

[2] Counting

The counting is performed by counting the correlation peak points of the reference waveform (FIG. 5(B)) held by the base station 21 with the down spread signals sent back from the identification cards 31.

Figure 6:
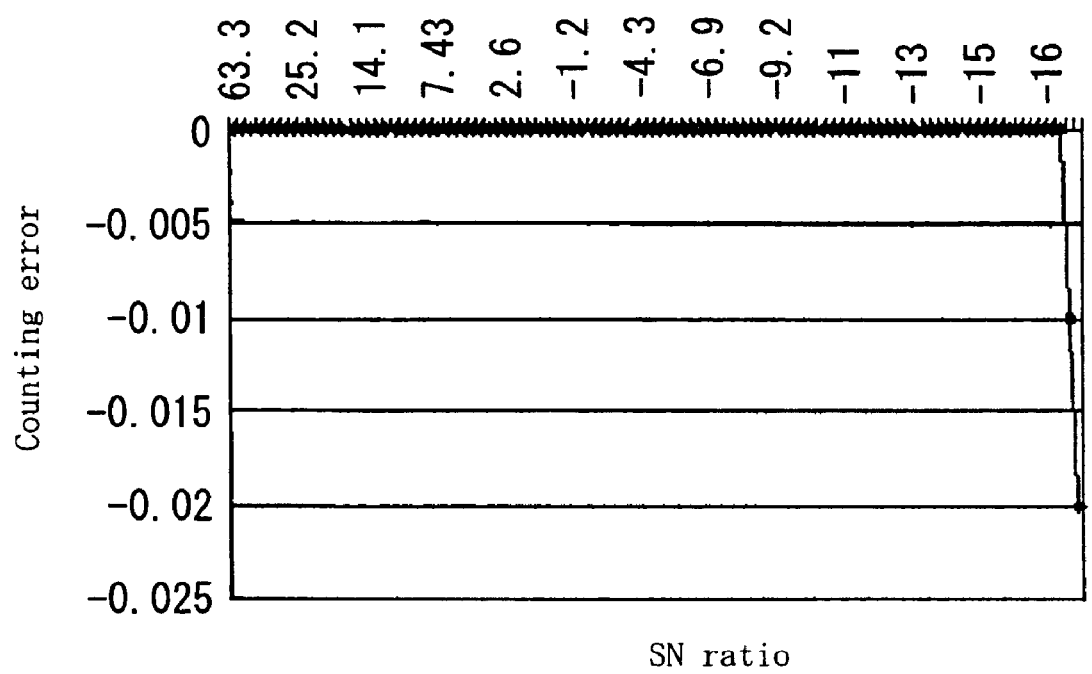
FIG. 6 is a characteristic view showing the result of simulating counting error relative to SN ratio using a calculator if there exists one person in an area at a variance of 1.0.

FIG. 6 is a characteristic view showing the simulation result of SN ratio/counting error using a calculator when one user exists in an area at a variance of 1.0. In FIG. 6, the horizontal axis indicates SN ratio and the vertical axis indicates counting error. The SN ratio is calculated by the following expression (12).

$$SN_{ratio}[\text{dB}] = 10 \; \log_{10} \frac{S^2}{N^2} \qquad (12)$$

In the expression (12), S denotes signal amplitude and N denotes noise amplitude.

As shown in FIG. 6, the calculator-based simulation result shows that if the SN ratio is up to about 16 dB, it is possible to make counting without error. This simulation result also shows that even if the SN ratio is negative, it is possible to make counting without error, i.e., even if noise is greater than the spread signal, it is possible to make counting without error.

Further, it is confirmed that if the SN ratio lowers, a counting error appears. In this simulation, 100 measurements are made and the average thereof is output. Therefore, with a counting error 0.01 shown in FIG. 6, results having one error in 100 measurements are output.

[3] Distance Measurement

The distance measurement is based on the values of correlation peak points. That is, since the correlation value changes by the factor of power attenuation due to the difference in distance from the base station 21 to the identification card 31 and the factor of the lowering of correlation due to a delay in the phase of the spread signal caused by the difference in distance, the distance is measured from simultaneous equations based on these two factors.

Figure 7:
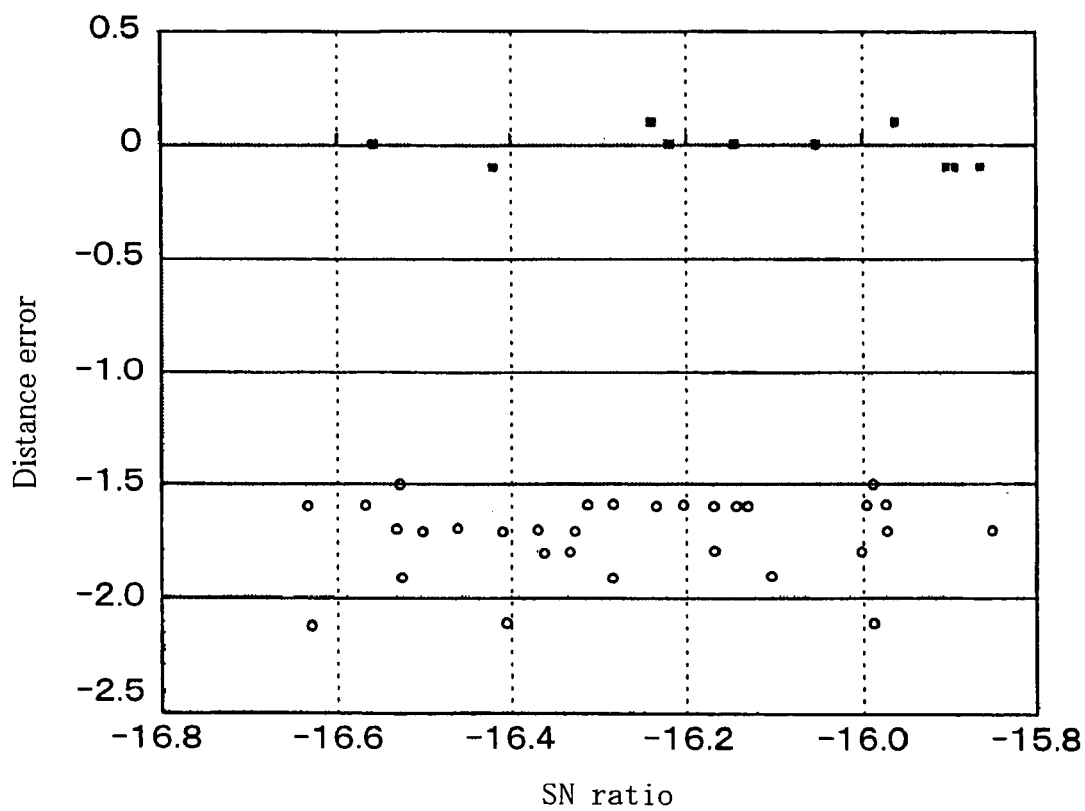
FIG. 7 is a characteristic view showing the result of simulating measured distance error relative to SN ratio using a calculator if one person in an area is distant from a base station by 30 meters.

FIG. 7 is a characteristic view showing a result of simulating the error of measured distance relative to SN ratio using a calculator when a person in an area is away from the base station by 30 meters. In FIG. 7, the horizontal axis indicates SN ratio and the vertical axis indicates distance error. In addition, respective points are averages of 100 measurements. In FIG. 7, a black square (■) mark indicates that there is no counting error and a white circle (○) mark indicates that there is a counting error.

As shown in FIG. 7, the calculator-based simulation shows that the averages denoted by the black square (■) marks each indicating that there is no counting error have hardly distance error.

On the other hand, the simulation shows that the averages denoted by the white circle (○) marks have distance errors. This is because the counting and distance measurement are made only from waveform correlation values. It is indicated that if the distance is measured using correlation values having counting errors, a good result cannot be obtained. Accordingly, it is confirmed that it is necessary to make counting before the distance measurement.

That is, at the base station 21, the up spread signal is correlated with the received down spread signal, the number of correlation peak points is counted based on the correlation and the distance is measured from the values of the correlation peak points based on the result of this counting.

As stated so far, according to each identification card 31 of the mobile body identification system 20 in this mode for carrying out the invention, the receiving antennas 32a and 32b receive spectrum-spread up spread signals, respectively, the DBM 36 and the delay elements 37 conduct predetermined individual processings to the up spread signals to thereby obtain a down spread signal, and this down spread signal is emitted by the transmission antenna 39 to external space. By doing so, the down spread signal obtained by conducting predetermined individual processings to the up spread signals is emitted from the identification card 31, the base station 21 which receives this down spread signal can know the presence of the identification card 31 and the distance from the base station 21 to the identification card 31 by the correlation of the up spread signals with the down spread signal. Accordingly, it is advantageously possible to measure the number of specific mobile bodies including the identification cards 31, respectively, and distances from the base station 21 to the specific mobile bodies including the identification cards 31, respectively. It is also advantageously possible to identify the specific mobile bodies including the identification cards 31, respectively.

Furthermore, according to each identification card 31 of the mobile body identification system 20 in this mode for carrying out the invention, the DBM 36 obtains the difference or sum of the line frequencies (A channel and B channel) of the up spread signals received on two or more line frequencies. By doing so, it is possible to individually process the line frequency (X channel) of the down spread signal to a frequency of the difference (A–B or B–A) or the sum (A+B) of the A channel and the B channel. It is, therefore, possible to emit the down spread signal on the X channel from the identification card 31 to the external space. Namely, frequency can be divided according to the difference or the sum of the A channel and the B channel. Therefore, the base station 21 which receives the down spread signal on the X channel can know the presence of the identification card 31 and know a distance from the base station 21 to the mobile body including the identification card 31. Accordingly, it is advantageously possible to measure the number of specific mobile bodies including the identification cards 31, respectively, and distances from the base station 21 to the specific mobile bodies including the identification cards 31, respectively. It is also advantageously possible to identify the specific mobile bodies including the identification cards 31, respectively.

Moreover, according to each identification card 31 of the mobile body identification system 20 in this mode for carrying out the invention, the delay element 37 delays the phase of the up spread signal by a predetermined quantity. It is thereby possible to conduct an individual processing to delay the phase of the up spread signal by a predetermined quantity and, therefore, possible to emit a down spread signal delayed in phase from the up spread signal by a predetermined quantity from the identification card 31 to external space. In other words, a code can be divided by delaying the phase of the up spread signal by a predetermined quantity. As a result, the base station 21 which receives the down spread signal can know the presence of the identification card 31 and a distance from the base station 21 to the identification card 31 by the correlation of the up spread signal with the down spread signal. Accordingly, it is advantageously possible to measure the number of specific mobile bodies including the identification cards 31, respectively, and distances from the base station 21 to the specific mobile bodies including the identification cards 31, respectively. It is also advantageously possible to identify the specific mobile bodies including the identification cards 31, respectively.

Moreover, according to each identification card 31 of the mobile body identification system 20 in this mode for carrying out the invention, the delay element 37 is provided at least in the front or rear stage of the DBM 36. It is thereby possible to conduct an individual processing to delay the phase of the up spread signal by a predetermined quantity in the front or rear stage of the DBM 36 or in front and rear stage of the DBM 36 and, therefore, possible for the delay element 37 to delay the phase of the up spread signal before or after or before and after the DBM 36 obtains the difference or the sum of the line frequencies. Accordingly, it is possible to increase a variation in the code division of the down spread signal by the phase delay of the up spread signal. Consequently, it is advantageously possible to increase the number of identifiable specific mobile bodies including the identification card 31, respectively.

Additionally, according to each identification card 31 of the mobile identification system 20 in this mode for carrying out the invention, the BPFs 34*a* and 34*b* each having a predetermined frequency band are provided between the receiving antennas 32*a*, 32*b* and the DBM 36. As a result, among the up spread signals received by the receiving antennas 32*a* and 32*b*, those on line frequencies higher or lower than the frequency bands of the BPFs 34*a* and 34*b* are prohibited from passing through the BPFs 34*a* and 34*b*. In other words, the up spread signals which can reach the DBM 36 are limited to those pass through the frequency bands of the BPFs 34*a* and 34*b*. Therefore, the BPFs 34*a* and 34*b* can select the up spread signals and the down spread signal only for the up spread signal on a specific line frequency can be sent back to the base station 21. Accordingly, it is advantageously possible to selectively identify specific mobile bodies including the identification cards 31, respectively.

Further, according to each identification card 31 of the mobile body identification system 20 in this mode for carrying out the invention, the BPFs 34*a* and 34*b* are included in the receiving antennas 32*a* and 32*b*, respectively. For example, by constituting the receiving antennas 32*a* and 32*b* by the print pattern of the printed board 50, the receiving antennas 32*a* and 32*b* which have the characteristics of the BPFs 34*a* and 34*b* and which also function as antennas, respectively are formed. As a result, it is unnecessary to separately constitute the receiving antennas 32*a* and 32*b* from the BPFs 34*a* and 34*b*, thereby making it possible to contribute to space saving. Accordingly, it is advantageously possible to easily realize a light, thin and small-sized identification card 31.

According to each identification card 31 of the mobile body identification system 20 in this mode for carrying out the invention, the BPF 38 having a predetermined frequency band is provided between the delay element 37 and the transmission antenna 39. As a result, unnecessary radiations on frequencies higher or lower than the frequency band of this BPF 38 in the down spread signal subjected to predetermined processings by the DBM 36 and the delay element 37, cannot pass through this BPF 38. That is, the frequency components of the down spread signal which can reach the transmission antenna 39 are limited to those pass through the frequency band of the BPF 38. It is, therefore, possible to eliminate unnecessary frequency components included in the down spread signal by the BPF 38 and to thereby improve the signal quality of the down spread signal. Accordingly, it is advantageously possible to ensure identifying a specific mobile body including the identification card 31.

In addition, according to each identification card 31 of the mobile body identification system 20 in this mode for carrying out the invention, the BPF 38 is included in the transmission antenna 39. For example, by constituting the transmission antenna 39 by the print pattern of the printed board 50, the transmission antenna 39 can be constituted to have the characteristic of the BPF 38 and to function as an antenna. As a result, it is unnecessary to separately provide the transmission antenna 39 and the BPF 38, making it possible to contribute to space saving. Accordingly, it is advantageously possible to easily realize a light, thin and small-sized identification card 31.

In addition, according to each identification card 31 of the mobile body identification system 20 in this mode for carrying out the invention, not only the receiving antennas 32*a* and 32*b* and the transmission antenna 39 but also the BPFs 34*a*, 34*b* and 38, the DBM 36 and the delay element 37 are constituted out of passive elements, respectively. It is thereby possible to realize the identification card 31 as a power supply-free device which requires no power supply. Accordingly, it is advantageously possible to more easily realize a light, thin and small-sized identification card because of no need of batteries and to easily realize a maintenance-free identification card 31.

In addition, according to each identification card 31 of the mobile body identification system 20 in this mode for carrying out the invention, the BPFs 34*a* and 34*b*, the DBM 36, the delay element 37 and the BPF 38 are incorporated in the printed board 50. It is, therefore, possible to make the identification card 31 thin by a printed board multilayer technique or the like. It is thereby possible to suppress the user's sense of incongruity even if the user carries the identification card 31 in the pocket of the user's clothes. It is also possible to use the identification card 31 by being bonded to a mobile body such as a vehicle. It is, therefore, possible to improve the rate of the use of the identification cards 31.

In addition, according to each identification card 31 of the mobile body identification system 20 in this mode for carrying out the invention, the receiving antennas 32*a* and 32*b* and the transmission antenna 39 are printed on the printed board 50. Therefore, compared with a case of constituting the identification card 31 while separately providing the receiving antennas 32*a* and 32*b* or the transmission antenna 39, it is possible to make the identification card 31 thinner. Also, it is possible to stabilize the performance and quality of the identification card 31 as an antenna. It is thereby possible to suppress the user's sense of incongruity even if the user carries the identification card 31 in the pocket of the user's clothes and to improve the yield of the identification cards 31. Accordingly, it is advantageously possible to improve the rate of the use of the identification card 31 and to supply an identification card 31 having stable performance and quality.

The mobile body identification system 20 in this mode for carrying out the invention includes the base station 21 which can transmit a spectrum-spread up spread signal, correlate this up spread signal with a received down spread signal, and measure the number of correlation peak points and the values of the correlation peak points based on this correlation, and the identification card 31 which receives the up spread signal, conducts a predetermined processing to the up spread signal and sends back the up spread signal as a down spread signal to the base station 21.

That is, the up spread signal transmitted from the base station 21 is received by the identification card 31. The identification card 31 which receives this up spread signal conducts a predetermined processing to the received up spread signal and sends back the spread signal as a down spread signal to the base station 21. The base station 21 which receives this down spread signal correlates the transmitted up spread signal with the received down spread signal, and measures the number of correlation peak points and the values of the correlation peak points based on this correlation. It is thereby possible for the base station 21 to know the presence of the identification cards 31 each of which receives the up spread signal and sends back the spread signal as the down spread signal and the number of the identification cards 31 from the number of correlation peak points. Also, it is possible to measure the distances from the base station 21 to the identification cards 31 based on the values of the correlation peak points. Accordingly, it is advantageously possible to measure the number of specific mobile bodies and distances from the base station 21 to the specific mobile bodies, respectively. In addition, it is advantageously possible to identify the specific mobile bodies.

According to the mobile body identification system 20 in this mode for carrying out the invention, up spread signals are transmitted on the A channel and the B channel, and a down spread signal is sent back on the line frequency (X channel) which is the difference (A−B or B−A) or the sum (A+B) of the A channel and the B channel. It is thereby possible to conduct frequency division to the down spread signal on the X channel by the difference or sum of the A channel and the B channel. As a result, it is possible for the base station which receives a down spread signal on the X channel to measure the presence of the identification card 31 and to measure the distance from the base station to the identification card 31 by the correlation of the up spread signal with the down spread signal. Accordingly, it is advantageously possible to measure the number of specific identification cards 31 and distances from the base station to the specific identification cards 31, respectively and to identify the specific identification cards 31.

According to the mobile body identification system 20 in this mode for carrying out the invention, the base station 21 conducts correlation using the matched filter consisting of SAW elements. It is thereby possible to simplify a constitution for correlating a plurality of up spread signals with a plurality of down spread signals, respectively, and to correlate them instantly. As a result, compared with a case of correlating the up spread signals with the down spread signals without using a matched filter consisting of SAW elements, it is possible to identify the identification cards 31 in a shorter time even if there are many identification card 31. Accordingly, it is advantageously possible to facilitate designing the mobile body identification system 20 even if many identification cards 31 are set as identification targets.

According to the mobile body identification system 20 in this mode for carrying out the invention, since the base station 21 conducts correlation using the sliding correlator, the mobile body identification system 20 is excellent in noise resistance when an up spread signal is correlated with a down spread signal. As a result, even if the up spread signal or the down spread signal contains much noise, it is possible to correlate the spread signals relatively easily. As a result, compared with a case of correlating the up and down spread signals without using the sliding correlator, it is possible satisfactorily correlate them even in an environment in which line quality is deteriorated. Accordingly, it is advantageously possible to easily design the mobile body identification system 20 in this environment.

In the above-stated mode for carrying out the invention, description has been given while taking a case of applying the mobile body identification system 20 to a system capable of grasping the number of bus passengers waiting for a bus at a bus station and a distance from the bus which is running on the road to the passengers waiting for the bus at real time, as an example. However, the present invention is not limited to this case. For example, the mobile body identification system 20 can be also applied to a system for counting visitors to a theater or checking vacant seats of the theater, a system for automatically starting playing a movie if the number of visitors at the seats of a theater reaches a predetermined number or more, a system for measuring the number of motor vehicles parked in a parking lot or checking vacant positions or parked positions or the like.

Further, if two or more base stations 21 are provided and up spread signals or line frequencies thereof are set to differ among the base stations 21, then it is possible to select identification cards 31 corresponding to the respective base stations 21.

That is, it is possible to discriminate the identification cards 31 to be identified among the base stations 21 from the received down spread signals. As a result, each base station 21 can appropriately select identifiable identification cards 31 by arbitrarily setting the spreading codes of the up spread signals and it is, therefore, possible to prevent the number of unnecessary identification cards 31 or distances from the base stations 21 to the respective unnecessary identification cards 31 from being measured. Accordingly, it is advantageously possible to easily design the mobile body identification system 20 in which the base stations 21 are set according to purposes such as bus passengers or taxi passengers.

Furthermore, it is possible to discriminate identification cards 31 to be identified from the received down spread signals according to the difference in line frequency. As a result, the base station 21 can appropriately select identifiable identification cards 31 by arbitrarily setting a line frequency. Therefore, in addition to the advantage obtained by the difference in spreading code, it is possible to prevent the number of unnecessary mobile bodies or the distances thereof from the base station from being measured. Accordingly, it is advantageously possible to easily design the mobile body identification system 20 even if base stations 21 are set complicatedly according to purposes.

In addition, by setting the number of up spread signals transmitted from the base station 21, i.e., setting the number of line frequencies (channels) at not smaller than 3, the result of the code product obtained by multiplying codes by the DBM 36 of the identification card 31 is complicated and more complicated ID information, i.e., "characteristic ID information" can be, therefore, created. It is thereby possible for the base station 21 to set the encryption of codes and, therefore, possible to apply identification cards 31 to credit cards or the like. Besides, it is possible to meet demand for automatically exchanging tolls to enable drivers to pass through tollgates without stopping on highways or the like associated with the development field of "electronic toll collection system" in the ITS.

Moreover, in the above-stated mode for carrying out the invention, an example of the configuration of the identification card 31 so that each identification card 31 can conduct fixed "predetermined individual processings" as the "signal processing means" of the identification card 31 has been described. However, the present invention is not limited to this example. The "signal processing means" may be constituted so as to conduct "predetermined individual processings" so that spread signals, spreading codes, line frequencies or the like can be arbitrarily changed.

That is, taking a case of the identification card 31 shown in FIG. 2 as an example, the delay element 37 may be constituted out of a plurality of types of delay lines having different delay time and the delay time can be arbitrarily changed over by a changeover switch which can select the delay lines.

By so constituting, the identification card 31 which receives the up spread signal transmitted from the base station 21 sends back a down spread signal after the arbitrarily switched delay line conducts "a predetermined individual processing" to the up spread signal. Therefore, only the base station 21 which can correspond to the "predetermined individual processing" conducted by the delay line thus switched can identify the down spread signal. In other words, the identification card 31 can arbitrarily change the down spread signal to be sent back, so that a base station 21 which can identify the down spread signal can be selected or limited.

Accordingly, even in an individual situation in which, for example, the owner of an identification card 31 carries only a taxi ticket of company A and does not carry that of company B, a down spread signal which cannot be identified by taxies other than those of company A can be sent back to the taxi companies by changing over the delay lines in the identification card 31. It is, therefore, possible to call a taxi limited to that of company A. That is, such a situation in which the owner of the identification card 31 erroneously calls a taxi of company B can be prevented.

In the above-stated mode for carrying out the invention, an example of the system for transmitting up spread signals from the base station 21 on so-called weak radio waves has been described. However, the present invention is not limited to this case. The present invention may be also applicable to a specific low electric power radio station or an in-house radio station specified under the ordinance of the Ministry of Posts and Telecommunications or the like. It is thereby possible to increase the transmission power of the base station to, for example, 10 mW and, therefore, to widen a counting and distance measuring range stated above.

According to the invention of a received radio wave transmission equipment recited in claim 1, a receiving antenna receives a spectrum-spread up spread signal, signal processing means conducts a predetermined individual processing to the up spread signal received by the receiving antenna to obtain a down spread signal, and a transmission antenna transmits the down spread signal to an external space. By doing so, the down spread signal obtained by conducting predetermined individual processings to the up spread signal is emitted to the external space from the received radio wave transmission equipment. Therefore, the side which receives this down spread signal can know the presence of the received radio wave transmission equipment and a distance to the received radio wave transmission equipment by the correlation of the up spread signal with the down spread signal. Accordingly, it is advantageously possible to measure the number of specific mobile bodies including the received radio wave transmission equipment, respectively, and distances to the specific mobile bodies including the received radio wave transmission equipment, respectively. It is also advantageously possible to identify the specific mobile bodies including the received radio wave transmission equipment, respectively.

According to the invention of a received radio wave transmission equipment recited in claim 2, the signal processing means comprises frequency mixing means and this frequency mixing means gives a difference or a sum between the two or more line frequencies of the up spread signal. It is thereby possible to individually process the line frequency of the down spread signal to a frequency of the difference or the sum of the line frequencies of the up spread signal. It is, therefore, possible to emit the down spread signal on the line frequency which is the difference or the sum of the line frequencies of the up spread signal from the received radio wave transmission equipment to the external space. Namely, frequency can be divided according to the difference or the sum of the line frequencies of the up spread signal. Therefore, the side which receives the down spread signal can know the presence of the received radio wave transmission equipment by this line frequency and know a distance to the received radio wave transmission equipment by the correlation of the up spread signal with the down spread signal. Accordingly, it is advantageously possible to measure the number of specific mobile bodies including the received radio wave transmission equipment, respectively, and distances to the specific mobile bodies including the received radio wave transmission equipment, respectively. It is also advantageously possible to identify the specific mobile bodies including the received radio wave transmission equipment, respectively.

According to the invention of a received radio wave transmission equipment recited in claim 3, the signal processing means comprises phase delay means and this phase delay means delays a phase of the up spread signal by a predetermined quantity. It is thereby possible to conduct an individual processing to delay the phase of the up spread signal by a predetermined quantity and, therefore, possible to emit a down spread signal delayed in phase from the up spread signal by a predetermined quantity from the received radio wave transmission equipment to the external space. In other words, a code can be divided by delaying the phase of the up spread signal by a predetermined quantity. As a result, the side which receives the down spread signal can know the presence of the received radio wave transmission equipment and a distance to the received radio wave transmission equipment by the correlation of the up spread signal with the down spread signal. Accordingly, it is advantageously possible to measure the number of specific mobile bodies including the received radio wave transmission equipment, respectively, and distances to the specific mobile bodies including the received radio wave transmission equipment, respectively. It is also advantageously possible to identify the specific mobile bodies including the received radio wave transmission equipment, respectively.

According to the invention of a received radio wave transmission equipment recited in claim 4, the signal processing means comprises frequency mixing means and phase delay means. The frequency mixing means gives a difference or a sum between the two or more line frequencies of the received up spread signal, and the phase delay means delays a phase of the up spread signal by a predetermined quantity. It is thereby possible to conduct an individual processing to the up spread signal to thereby set the line frequency of a down signal at the difference or the sum of the line frequencies of the up spread signal. In addition, since it is possible to conduct an individual processing to the up spread signal to delay the phase of the up spread signal by a predetermined quantity, it is possible to emit the down spread signal delayed in phase from the up spread signal by a predetermined quantity on a line frequency which is the difference or the sum of the line frequencies of the up spread signal to the external space. That is, it is possible to conduct both code division by delaying the phase of the up spread signal by a predetermined quantity and frequency division by the difference or the sum of the line frequencies of the up spread signal. Accordingly, the side which receives the down spread signal can know the presence of the received radio wave transmission equipment by a combination of the line frequency and the phase delay quantity of the down spread signal, making it possible to increase the number of identifiable received radio wave transmission equipment. In other words, it is advantageously possible to increase the identifiable number of specific mobile bodies including the received radio wave transmission equipment, respectively.

According to the invention of a received radio wave transmission equipment recited in claim 5, the phase delay means is provided in at least one of a front stage of the frequency mixing means and a rear stage of the frequency mixing means. It is thereby possible to conduct an individual processing to the up spread signal to delay the phase of the up spread signal by a predetermined quantity in the front or rear stage of the frequency mixing means and, therefore, possible for the delay means to delay the phase of the up spread signal before or after or before and after the frequency mixing means obtains the difference or the sum of the line frequencies. Accordingly, it is possible to increase a variation in the code division of the down spread signal by the phase delay of the up spread signal. Consequently, it is advantageously possible to increase the number of identifiable specific mobile bodies including the received radio wave transmission equipment, respectively.

According to the invention of a received radio wave transmission equipment recited in claim 6, a first bandpass filter having a predetermined frequency band is provided between the receiving antenna and the signal processing means. As a result, among the up spread signals received by the receiving antenna, those on line frequencies higher or lower than the predetermined frequency band are prohibited from passing through the first bandpass filter. In other words, the up spread signals which can reach the signal processing means are limited to those pass through the predetermined frequency band. Therefore, the first bandpass filter can select an up spread signal and a down spread signal can be sent back only for the up spread signal on a specific line frequency. Accordingly, it is advantageously possible to selectively identify specific mobile bodies including the received radio wave transmission equipment, respectively.

According to the invention of a received radio wave transmission equipment recited in claim 7, the first bandpass filter is included in the receiving antenna. For example, by constituting the receiving antenna by the conductor pattern of a printed wiring board, the receiving antenna which has the characteristic of the first bandpass filter and which also functions as an antenna is formed. As a result, it is unnecessary to separately constitute the receiving antenna from the first bandpass filter, thereby making it possible to contribute to space saving. Accordingly, it is advantageously possible to easily realize a light, thin and small-sized the received radio wave transmission equipment.

According to the invention of a received radio wave transmission equipment recited in claim 8, a second bandpass filter having a predetermined frequency band is provided between the signal processing means and the transmission antenna. As a result, unnecessary radiations on frequencies higher or lower than the predetermined frequency band in the down spread signal subjected to a predetermined processing by the signal processing means, cannot pass through this second bandpass filter. That is, the frequency components of the down spread signal which can reach the transmission antenna are limited to those pass through the predetermined frequency band. It is, therefore, possible to eliminate unnecessary frequency components included in the down spread signal by the second bandpass filter and to thereby improve the signal quality of the down spread signal. Accordingly, it is advantageously possible to ensure identifying a specific mobile body including the received radio wave transmission equipment.

According to the invention of a received radio wave transmission equipment recited in claim 9, the second bandpass filter is included in the transmission antenna. For example, by constituting the transmission antenna by the conductor pattern of a printed wiring board, the transmission antenna can be constituted to have the characteristic of the second bandpass filter and to also function as an antenna. As a result, it is unnecessary to separately provide the transmission antenna from the second bandpass filter, making it possible to contribute to space saving. Accordingly, it is advantageously possible to easily realize a light, thin and small-sized received radio wave transmission equipment.

According to the invention of a received radio wave transmission equipment recited in claim 10, since the signal processing means consists of a passive element, the received radio wave transmission equipment requires no power supply. It is thereby possible to realize a power supply-free device. Accordingly, it is advantageously possible to more easily realize a light, thin and small-sized received radio wave transmission equipment because of no need of batteries and to easily realize a maintenance-free received radio wave transmission equipment.

According to the invention of a received radio wave transmission equipment recited in claim 11, the signal processing means is incorporated in a printed wiring board. Itis, therefore, possible to make the received radio wave transmission equipment thin by a printed wiring board multilayer technique or the like. It is thereby possible to suppress the sense of incongruity of the user of the received radio wave transmission equipment even if the user carries the received radio wave transmission equipment in the pocket of the user's clothes. It is also possible to use the received radio wave transmission equipment by being bonded to a mobile body such as a vehicle. It is, therefore, possible to improve the rate of the use of the received radio wave transmission equipment.

According to the invention of a received radio wave transmission equipment recited in claim 12, at least one of the receiving antenna and the transmission antenna is printed on a printed wiring board. Therefore, compared with a case of constituting the received radio wave transmission equipment while separately providing the receiving antenna or the transmission antenna, it is possible to make the received radio wave transmission equipment thinner. Also, it is possible to stabilize the performance and quality of the received radio wave transmission equipment as an antenna. It is thereby possible to suppress the sense of incongruity of the user of the received radio wave transmission equipment even if the user carries the received radio wave transmission equipment in the pocket of the user's clothes and to improve the yield of the received radio wave transmission equipment. Accordingly, it is advantageously possible to improve the rate of the use of the received radio wave transmission equipment and to supply a received radio wave transmission equipment having stable performance and quality.

According to the invention of a mobile body identification system recited in claim 13, a base station transmitting a spectrum-spread up spread signal, correlating the up spread signal with a received down spread signal, and capable of measuring the number of correlation peak points and values of the correlation peak points based on this correlation, and a mobile body receiving the up spread signal, conducting an individual processing to the up spread signal, and sending back the up spread signal as the down spread signal to the base station are provided. That is, the up spread signal transmitted from the base station is received by the mobile body. The mobile body which receives this up spread signal conducts a predetermined processing to the received up spread signal and sends back the spread signal as a down spread signal to the base station. The base station which receives this down spread signal correlates the transmitted up spread signal with the received down spread signal, and measures the number of correlation peak points and the values of the correlation peak points based on this correlation. It is thereby possible for the base station to know the presence of the mobile bodies each of which receives the up spread signal and sends back the spread signal as the down spread signal and the number of the mobile bodies from the number of correlation peak points. Also, it is possible to measure the distances from the base station to the mobile bodies based on the value of the correlation peak points. Accordingly, it is advantageously possible to measure the number of specific mobile bodies and distances from the base station to the specific mobile bodies, respectively. In addition, it is advantageously possible to identify the specific mobile bodies.

According to the invention of a mobile body identification system recited in claim 14, the up spread signal is transmitted on two or more line frequencies, and the down spread signal is sent back on a line frequency given by a difference or a sum between the two or more line frequencies. It is thereby possible to conduct frequency division to the down spread signal by the difference or sum of the line frequencies of the up spread signal. As a result, it is possible for the base station which receives a down spread signal to measure the presence of the mobile body and to measure a distance from the base station to the mobile body by the correlation of the up spread signal with the down spread signal. Accordingly, it is advantageously possible to measure the number of specific mobile bodies and distances from the base station to the specific mobile bodies, respectively and to identify the specific mobile bodies.

According to the invention of a mobile body identification system recited in claim 15, the base station conducts correlation using a matched filter consisting of an SAW element. It is thereby possible to simplify a constitution for correlating a plurality of up spread signals with a plurality of down spread signals, respectively, and to correlate them instantly. As a result, compared with a case of correlating the up spread signals with the down spread signals without using a matched filter consisting of an SAW element, it is possible to identify the mobile bodies in a shorter time even if there are many mobile bodies. Accordingly, it is advantageously possible to facilitate designing the mobile body identification system even if many mobile bodies are set as identification targets.

According to the invention of a mobile body identification system recited in claim 16, the base station conduct correlation using a sliding correlator. Therefore, the mobile body identification system is excellent in noise resistance if an up spread signal is correlated with a down spread signal. As a result, even if the up spread signal or the down spread signal contains much noise, it is possible to correlate the spread signals relatively easily. As a result, compared with a case of correlating the up and down spread signals without using the sliding correlator, it is possible satisfactorily correlate them even in an environment in which line quality is deteriorated. Accordingly, it is advantageously possible to easily design the mobile body identification system in this environment.

According to the invention of a mobile body identification system recited in claim 17, the up spread signal is transmitted from two or more base stations having different spreading codes, respectively. That is, it is possible for the base stations to discriminate the mobile bodies to be identified among the received down spread signals based on the differences of the spread codes. As a result, each base station can appropriately select identifiable mobile bodies by arbitrarily setting the spreading codes of the up spread signals and it is, therefore, possible to prevent the number of unnecessary mobile bodies or distances from the base to the respective unnecessary mobile bodies from being measured. Accordingly, it is advantageously possible to easily design the mobile body identification system in which the base stations are set according to purposes.

According to the invention of a mobile body identification system recited in claim 18, since the up spread signal is transmitted from two or more the base stations having different line frequencies, respectively, it is possible to discriminate mobile bodies to be identified from the received down spread signals according to the difference in line frequency. As a result, the base station can appropriately select identifiable mobile bodies by arbitrarily setting a line frequency. Therefore, in addition to the advantage obtained by the difference in spreading signal, it is possible to prevent the number of unnecessary mobile bodies or the distances thereof from the base station from being measured. Accordingly, it is advantageously possible to easily design the mobile body identification system even if base stations are set more complicatedly according to purposes.

What is claimed is:

1. A received radio wave transmission equipment characterized by comprising:
   a receiving antenna receiving a spectrum-spread up spread signal;
   signal processing means for conducting a predetermined individual processing to said up spread signal received by said receiving antenna to obtain a down spread signal; and
   a transmission antenna transmitting said down spread signal to an external space,
   wherein said up spread signal is received on two or more line frequencies, and
   wherein said signal processing means comprises frequency mixing means for giving a difference or a sum between said two or more line frequencies.

2. A received radio wave transmission equipment according to claim 1, characterized in that
   said signal processing means comprises phase delay means for delaying a phase of said up spread signal by a predetermined quantity.

3. A received radio wave transmission equipment characterized by comprising:
   a receiving antenna receiving a spectrum-spread up spread signal;
   signal processing means for conducting a predetermined individual processing to said up spread signal received by said receiving antenna to obtain a down spread signal; and
   a transmission antenna transmitting said down spread signal to an external space, characterized in that
   said up spread signal is received on two or more line frequencies,
   said signal processing means comprises: frequency mixing means for giving a difference or a sum between said two or more line frequencies; and phase delay means for delaying a phase of said up spread signal by a predetermined quantity.

4. A received radio wave transmission equipment according to claim 3, characterized in that
   said phase delay means is provided in at least one of a front stage of said frequency mixer and a rear stage of said frequency mixing.

5. A received radio wave transmission equipment according to any one of claims 1, 2, 3, or 4, characterized in that
   a first bandpass filter having a predetermined frequency band is provided between said receiving antenna and said signal processing means.

6. A received radio wave transmission equipment according to claim 5, characterized in that
   said first bandpass filter is included in said receiving antenna.

7. A received radio wave transmission equipment according to claim 1 or 3, characterized in that
   a second bandpass filter having a predetermined frequency band is provided between said signal processing means and said transmission antenna.

8. A received radio wave transmission equipment according to claim 7, characterized in that
   said second bandpass filter is included in said transmission antenna.

9. A received radio wave transmission equipment according to claim 1, comprising:
   a receiving antenna receiving a spectrum-spread up spread signal;
   signal processing means for conducting a predetermined individual processing to said up spread signal received by said receiving antenna to obtain a down spread signak and
   a transmission antenna transmitting said down spread signal to an external space,
   characterized in that said signal processing means consists of a passive element.

10. A received radio wave transmission equipment according to claim 1 or 9, characterized in that
    said signal processing means is incorporated in a printed wiring board.

11. A received wave transmission equipment according to claim 1 or 9, characterized in that
    at least one of said receiving antenna and said transmission antenna is printed on a printed wiring board.

12. A mobile body identification system characterized by comprising:
    a base station transmitting a spectrum-spread up spread signal, correlating the up spread signal with a received down spread signal, and capable of measuring the number of correlation peak points and values of the correlation peak points based on this correlation; and
    a mobile body receiving said up spread signal, conducting a predetermined individual processing to the up spread signal, and sending back the up spread signal as said down spread signal to said base station,
    wherein said up spread signal is transmitted on two or more line frequencies, and
    wherein said down spread signal is sent back on a line frequency given by a difference or a sum between said two or more line frequencies.

13. A mobile body identification system according to claim 12, characterized in that
    said base station conducts correlation using a matched filter consisting of an SAW element.

14. A mobile body identification system according to claim 12, characterized in that
    said base station conducts correlation using a sliding correlater.

15. A mobile body identification system according to claim 12, 13, or 14, characterized in that
    said up spread signal is transmitted from two or more said base stations having different spreading codes, respectively.

16. A mobile body identification system according to claim 12, 13, or 14, characterized in that
    said up spread signal is transmitted from two or more said base stations having different line frequencies, respectively.

17. A received wave transmission equipment according to claim 10, characterized in that
    at least one of said receiving antenna and said transmission antenna is printed on a printed wiring board.

18. A mobile body identification system according to claim 15, characterized in that
    said up spread signal is transmitted from two or more said base stations having different line frequencies, respectively.

* * * * *